(12) United States Patent
Koseoglu

(10) Patent No.: US 11,459,515 B2
(45) Date of Patent: Oct. 4, 2022

(54) PROCESS FOR UPGRADING HYDROCARBON FEEDSTOCK UTILIZING LOW PRESSURE HYDROPROCESSING AND CATALYST REJUVENATION/REGENERATION STEPS

(71) Applicant: SAUDI ARABIAN OIL COMPANY, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/061,933

(22) Filed: Oct. 2, 2020

(65) Prior Publication Data
US 2022/0106531 A1    Apr. 7, 2022

(51) Int. Cl.
*C10G 65/04* (2006.01)
*B01J 8/08* (2006.01)

(52) U.S. Cl.
CPC .............. *C10G 65/04* (2013.01); *B01J 8/085* (2013.01); *C10G 2300/107* (2013.01); *C10G 2300/1044* (2013.01); *C10G 2300/1077* (2013.01); *C10G 2300/202* (2013.01); *C10G 2300/205* (2013.01); *C10G 2300/308* (2013.01); *C10G 2300/4018* (2013.01); *C10G 2300/706* (2013.01)

(58) Field of Classification Search
None
See application file for complete search history.

(56) References Cited

U.S. PATENT DOCUMENTS

| | | | |
|---|---|---|---|
| 2,987,470 A * | 6/1961 | Turken | C10G 31/06 208/253 |
| 3,900,390 A | 8/1975 | Adams et al. | |
| 3,932,269 A | 1/1976 | Lehman | |
| 4,167,474 A | 9/1979 | Sikonia | |
| 4,576,710 A | 3/1986 | Nongbri et al. | |
| 4,595,666 A | 6/1986 | Ganguli | |
| 4,940,529 A * | 7/1990 | Beaton | C10G 69/04 208/108 |
| 5,445,728 A | 8/1995 | Sherwood, Jr. et al. | |
| 5,589,057 A * | 12/1996 | Trimble | B01J 8/003 208/148 |
| 5,906,953 A | 5/1999 | Duddy et al. | |

(Continued)

FOREIGN PATENT DOCUMENTS

| | | |
|---|---|---|
| GB | 845771 | 7/1957 |
| GB | 831247 | 7/1958 |

OTHER PUBLICATIONS

S. Abotteen, et al., "Effective use of catalysts through catalyst regeneration," Published 2005, pp. 1-9 (available at https://www.eurecat.com/pdf/effective-use-of-catalyst-regeneration.pdf).

(Continued)

*Primary Examiner* — Tam M Nguyen
(74) *Attorney, Agent, or Firm* — Leason Ellis LLP

(57) ABSTRACT

Heavy hydrocarbon feedstocks including crude oil are upgraded under relatively low pressure conditions in an ebullated-bed hydroprocessing zone to remove the heteroatom containing hydrocarbons. Catalyst particles are regenerated/rejuvenated and recycled back to the ebullated-bed hydroprocessing reaction zone. The regeneration/rejuvenation is effective to restore catalytic activity while minimizing leaching of the active components(s).

14 Claims, 3 Drawing Sheets

(56) References Cited

U.S. PATENT DOCUMENTS

| | | | |
|---|---|---|---|
| 5,925,238 A * | 7/1999 | Duddy | C10G 65/04 |
| | | | 208/210 |
| 7,699,974 B2 | 4/2010 | Hedrick | |
| 8,007,662 B2 | 8/2011 | Lomas et al. | |
| 8,163,247 B2 | 4/2012 | Lomas et al. | |
| 2013/0292299 A1 | 11/2013 | Koseoglu et al. | |
| 2018/0195013 A1* | 7/2018 | Dreillard | B01J 23/755 |
| 2019/0016974 A1* | 1/2019 | Moore | C10G 25/02 |
| 2020/0339894 A1* | 10/2020 | Marques | C10G 45/08 |
| 2021/0102130 A1* | 4/2021 | Marques | C10G 47/02 |
| 2021/0130712 A1* | 5/2021 | Abudawoud | B01D 3/143 |
| 2021/0246381 A1* | 8/2021 | Koseoglu | C10G 69/04 |
| 2021/0246386 A1* | 8/2021 | Koseoglu | C10G 69/02 |
| 2021/0246388 A1* | 8/2021 | Koseoglu | C10B 55/02 |
| 2021/0292662 A1* | 9/2021 | Corre | B01J 37/0063 |

OTHER PUBLICATIONS

M.A. Gerber, et al., "Regeneration of Hydrotreating and FCC Catalysts," Techincal Report, U.S. Department of Energy (DOE Contract AC05-76RL01830), Sep. 30, 1999, 58 pages.

M.D. Argyle, et al., "Heterogeneous Catalyst Deactivation and Regeneration: A Review," Catalysts, 5:145-269 (2015).

International Search Report and Written Opinion in corresponding International Patent Application No. PCT/US2021/052584 dated Jan. 14, 2022. 9 pages.

Marafi et al. "Chapter 5: Regeneration." Handbook of Spent Hydroprocessing Catalysts, Second Edition, Elsevier, Amsterdam, Netherlands, 2017, pp. 141-220.

* cited by examiner

PROCESS FOR UPGRADING HYDROCARBON FEEDSTOCK UTILIZING LOW PRESSURE HYDROPROCESSING AND CATALYST REJUVENATION/REGENERATION STEPS

RELATED APPLICATIONS

Not applicable.

BACKGROUND

Field of the Invention

The present invention relates to upgrading hydrocarbon feedstocks such as crude oil utilizing low pressure hydroprocessing units.

Description of Related Art

Crude oil is conventionally processed by distillation followed by various cracking, solvent refining and hydroconversion processes to produce a desired slate of fuels, lubricating oil products, chemicals, chemical feedstocks and the like. An example of a conventional process includes distillation of a crude oil in an atmospheric distillation column to form gas oil, naphtha, a gaseous product, and atmospheric residuum. Generally, the atmospheric residuum is further fractionated in a vacuum distillation column to produce vacuum gas oil and a vacuum residuum.

Conventionally hydroprocessing is used to remove impurities such as sulfur, nitrogen and/or metals (particularly in residue feedstocks), and for cracking heavier hydrocarbons into light hydrocarbons to obtain transportation fuels such as gasoline and diesel. The reactions that occur in hydrocracking/hydroprocessing of residual oils operations include hydrodesulfurization (HDS), hydrodenitrogenation (HDN), hydrodemetallization (HDM), carbon residue reduction (CRR), hydrocracking (HCK) and hydrogenation (HGN).

Heavy crude oils require deep conversion and refining into lighter and cleaner components through costly techniques, which normally employ high pressures and temperatures. Integration of these deep conversion and refilling techniques into existing refineries can be a costly addition and generally the lower the API of the crude oil, the more constrained the unit will be due to higher associated metals, asphaltene, sulfur and nitrogen.

The market price differential between sweet and sour whole crude oil can be significant. The availability of light sweet crude oil linked to the production means and source. In certain geographic regions, oil recovered is limited to heavy crude oil. Further, production based on tertiary and other enhanced recovery techniques yields predominantly heavier crudes and sour crudes.

Therefore, upgrading crude oil can provide a significant advantage for refinery processes. Advances have been made in the industry in hydroprocessing crude oil and heavy fractions for the purpose of improving heavy oils prior to fractioning into individual straight run distillate fractions. Hydrotreating heavy crude oils for the purpose of upgrading the oil permits reduction of sulfur content of the oil (i.e., "sweetening" the oil), an increase in the API gravity of the heavy oil (i.e., providing a lighter crude oil) and a reduction in the metal content of the heavy oil. Heavier crudes contain a larger proportion of heavy and sour material such as high boiling vacuum residue fractions. Upgrading heavy crudes into feedstocks effective to produce clean fuel is becoming increasingly important.

One major technical challenge posed when hydroprocessing heavy oil fractions or whole crude is the effect of small concentrations of contaminants, such as for example, organic metal compounds and polynuclear aromatic compounds. Metals are normally present in the form of porphyrin type structures and they often contain nickel and/or vanadium, which have a significant deactivating effect on the catalyst. These organometallic compounds and others have been proven to reduce the activity or lifetime of hydrotreating catalysts. The metal contaminants and polynuclear aromatics result in reduced process performance or increased capital and/or operating cost of refinery processing units. The metals contaminants in residual crude oil fractions deposit on the hydroprocessing catalyst pores and result in catalyst deactivation. The polynuclear aromatic compounds are coke precursors and form coke at high temperatures, which also results catalyst deactivation. To minimize the catalyst deactivation problems, hydroprocessing units are conventionally designed to operate at high pressures, which necessarily increases both capital cost in the vessels and auxiliary equipment and operational costs.

Known processes such as conventional refining are available for upgrading crude oil, but require significant expense due to high severity hydroprocessing designs, including operating pressures higher than 150 bars. Available methods for upgrading and/or desulfurizing crude oil feedstocks have known limitations. For example, fixed-bed reactor units used to process whole crude oil require frequent shut-down to permit catalyst unloading and replacement due to metal contamination. This reduces the on-stream factor and as a result increases the processing costs.

As the refining industry increasingly processes high sulfur, low API crude oil feeds, catalyst deactivation becomes an important concern. This is one of the main limiting factors for hydrotreating units. As the heavy hydrocarbon feedstock being treated becomes heavier, that is has a lower API Gravity, the complexity of the molecules increases. This increase in complexity is both in the molecular weight and also in the degree of unsaturated components. Both of these effects increase the coking tendency of the feedstock, which is one of the main mechanisms causing catalyst deactivation. Another factor that causes catalyst deactivation is the metal content present in the heavy hydrocarbon feedstock, such as certain crude oil feedstocks. These metals are typically present in the form of porphyrin type structures and they often contain nickel and/or vanadium, which have a significant deactivating impact on the catalyst.

Conventional approaches to minimize catalyst deactivation is operation of the hydroprocessing unit a high pressure levels. However, this results in complexity in reactor design and construction, since the vessels must operate under these higher pressure levels. Further, capital and operational costs increase with higher pressure levels.

Therefore, a need exists for improved processes and systems for upgrading crude oil and/or processing heavy residual fractions having high metal content, including orgaometallic compounds and free metals, and/or having a high content of polynuclear aromatic compounds.

SUMMARY

The above objects and further advantages are provided by the system and process for upgrading heavy hydrocarbon feedstocks including crude oil. In the hydroprocessing subsystem feedstock is desulfurized, denitrogenized and demetalized under relatively low pressure conditions in an ebullated-bed hydroprocessing zone to remove the heteroatom containing hydrocarbons. Heavy hydrocarbon molecules are cracked in the presence of hydrogen to form lighter hydrocarbons molecules to produce upgraded crude oil products, for instance, suitable as feeds for refinery operations tailored for transportation fuel production. Catalysts materials effective for residue hydrocracking are utilized in the hydrotreating/hydrocracking step. Catalyst particles, in certain embodiments in the form of extrudates of alumina, silica or alumina-silica including one or more active components for upgrading crude oil or residue (vacuum or atmospheric), are regenerated/rejuvenated and recycled back to the ebullated-bed hydroprocessing reaction zone, as described in more detail herein. The regeneration/rejuvenation is effective to restore catalytic activity while minimizing leaching of the active components(s).

In one embodiment a process for upgrading crude oil comprises hydroprocessing a heavy hydrocarbon feedstock at a hydrogen partial pressure of less than 100 bars in an ebullated-bed hydroprocessing unit having an associated ebullating pump and a catalyst replacement system to produce an effluent which is recovered as an upgraded heavy hydrocarbon effluent. Catalyst used in the ebullated-bed hydroprocessing unit comprises heterogeneous catalyst particles having active components incorporated on a support and which are characterized by an initial catalytic activity when the catalyst particles are freshly added to the ebullated-bed hydroprocessing unit. Spent catalyst particles having contaminant metals and coke are withdrawn from the ebullated-bed hydroproces sing unit. The spent catalyst particles have reduced catalytic activity compared to the initial catalytic activity. The next step is rejuvenating spent catalyst particles to reduce contaminant metals and produce intermediate rejuvenated catalyst particles. The intermediate rejuvenated catalyst particles are then regenerated to reduce coke and produce rejuvenated/regenerated catalyst particles. The rejuvenated/regenerated catalyst particles have increased catalytic activity relative to the spent catalyst particles, and are recycled to the ebullated-bed hydroprocessing unit.

In the above process, the heavy hydrocarbon feedstock can comprise crude oil, crude oil having naphtha removed, atmospheric residue or vacuum residue.

In the above process, the upgraded heavy hydrocarbon effluent can be separated into a light fraction and an upgraded heavy fraction. The upgraded heavy fraction can comprise atmospheric residue or vacuum residue. All or a portion of the upgraded heavy fraction can be recycled to the ebullated-bed hydroprocessing unit. The light fraction can be hydrotreated in a fixed bed hydrotreater to produce a hydrotreated light fraction effluent. The hydrotreated light fraction effluent can be combined with the upgraded heavy fraction to produce a further upgraded heavy hydrocarbon effluent.

In one embodiment, a process for upgrading a crude oil stream comprises fractionating the crude oil into a distillates fraction and atmospheric residue, hydrotreating the distillates fraction in a fixed-bed hydrotreating unit to produce a hydrotreated distillate effluent, and hydroprocessing the atmospheric residue at a hydrogen partial pressure of less than 100 bars in an ebullated-bed hydroprocessing unit having an associated ebullating pump and a catalyst replacement system to produce an effluent which is recovered as an upgraded residue effluent. Catalyst used in the ebullated-bed hydroprocessing unit comprises heterogeneous catalyst particles having active components incorporated on a support and which are characterized by an initial catalytic activity when the catalyst particles are freshly added to the ebullated-bed hydroprocessing unit. Spent catalyst particles having contaminant metals and coke are withdrawn from the ebullated-bed hydroprocessing unit. The spent catalyst particles have reduced catalytic activity compared to the initial catalytic activity. The next step is rejuvenating spent catalyst particles to reduce contaminant metals and produce intermediate rejuvenated catalyst particles. The intermediate rejuvenated catalyst particles are then regenerated to reduce coke and produce rejuvenated/regenerated catalyst particles. The rejuvenated/regenerated catalyst particles have increased catalytic activity relative to the spent catalyst particles, and are recycled to the ebullated-bed hydroprocessing unit. In certain embodiments, the hydrotreated distillate effluent can be combined with the upgraded residue to produce upgraded crude oil.

In any of the above processes, wherein the catalytic activity of the rejuvenated/regenerated catalyst particles is 95, 96, 98, 99, 99.9% of the initial catalytic activity. In the above processes, metals accumulate on the catalyst particles during reaction in the ebullated-bed hydroprocessing unit, and wherein up to 70, 75, 80, 90, 95 or 99 wt % of the metals that accumulated on the catalyst particles are removed. Rejuvenating spent catalyst particles generally comprises solvent washing and acid washing to remove undesired metals. Regenerating the intermediate rejuvenated catalyst particles generally comprises combustion in an oxidizing atmosphere to burn carbonaceous species and redisperse active phase metal on the catalyst particles.

A system for upgrading crude oil comprises an ebullated-bed hydroprocessing unit including an associated ebullating pump and a catalyst replacement system, the ebullated-bed hydroprocessing unit including one or more inlets in fluid communication with a source of heavy hydrocarbon feedstock and hydrogen, one or more inlets in fluid, slurry or solid communication with a source of rejuvenated/regenerated catalyst particles, one or more outlets for discharging vapor/liquid products, and one or more outlets for discharging spent catalyst particles. Catalyst used in the ebullated-bed hydroprocessing unit comprises heterogeneous catalyst particles having active components incorporated on a support and which are characterized by an initial catalytic activity when the catalyst particles are freshly added to the ebullated-bed hydroprocessing unit, wherein spent catalyst particles from the ebullated-bed hydroprocessing unit having contaminant metals and coke, wherein the spent catalyst has a reduced catalytic activity compared to the initial catalytic activity. A rejuvenating system is provided in fluid, slurry or solid communication with the one or more outlets for discharging spent catalyst particles, and operable to and produce intermediate rejuvenated catalyst particles. A regenerating system is provided in fluid, slurry or solid communication with the rejuvenating system to receive intermediate rejuvenated catalyst particles, and is operable to produce rejuvenated/regenerated catalyst particles. The regenerating system is the source of rejuvenated/regenerated catalyst particles, wherein the rejuvenated/regenerated catalyst particles have increased catalytic activity relative to the spent catalyst particles.

Other aspects, embodiments, and advantages of the process of the present invention are discussed in detail below. Moreover, it is to be understood that both the foregoing information and the following detailed description are merely illustrative examples of various aspects and embodiments, and are intended to provide an overview or framework for understanding the nature and character of the claimed features and embodiments. The accompanying drawings are illustrative and are provided to further the understanding of the various aspects and embodiments of the process of the invention.

BRIEF DESCRIPTION OF THE DRAWINGS

The invention will be described in further detail below and with reference to the attached drawings in which the same or similar elements are referred to by the same number, and where.

DETAILED DESCRIPTION

Figure 1:
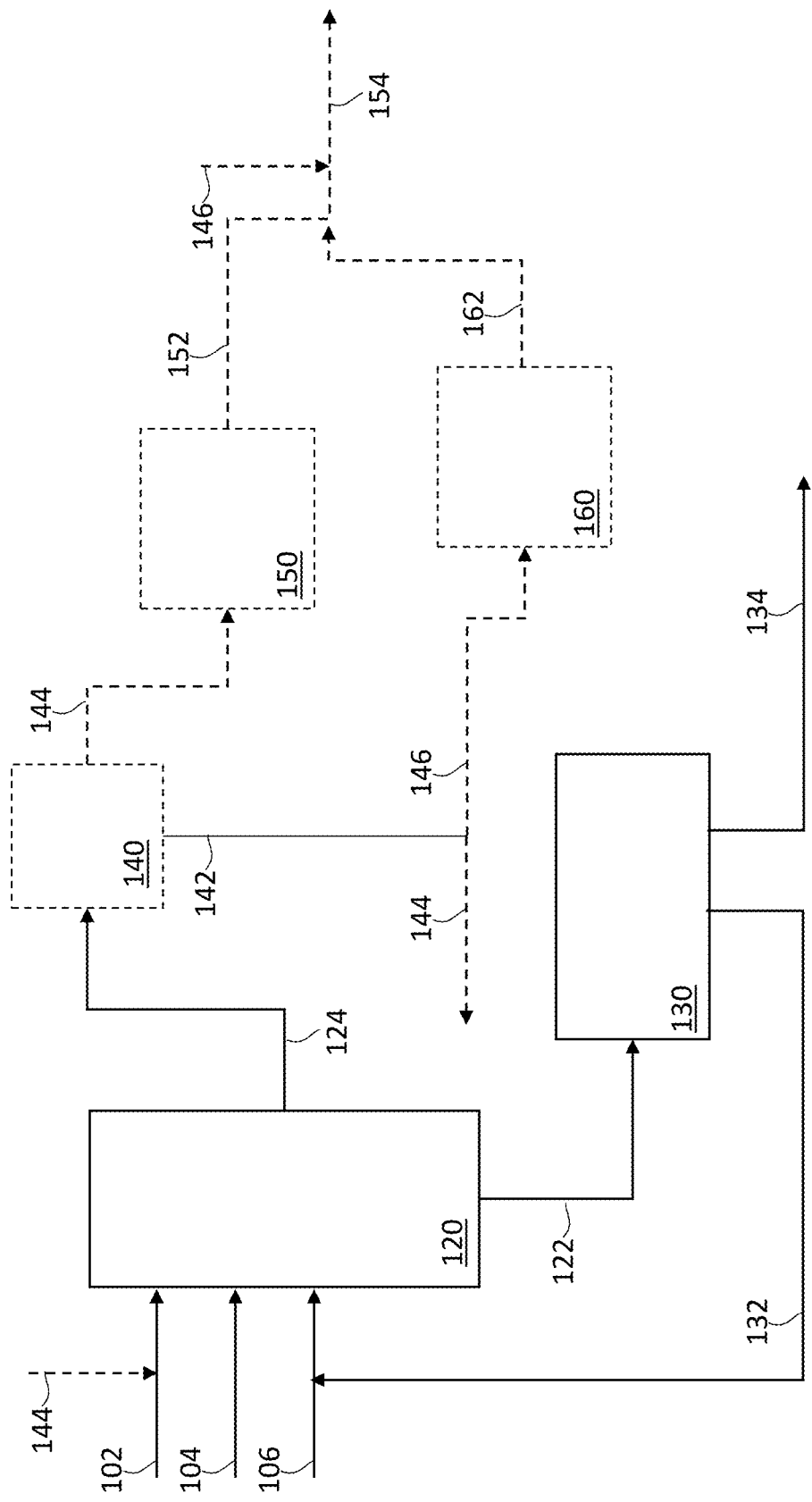
FIG. 1 is a schematic process flow diagram of an embodiment of a process to produce upgraded crude oil including low pressure hydroprocessor integrated with a catalyst rejuvenation system.

Process scheme configurations are disclosed that enable upgrading of heavy hydrocarbon feedstocks using low pressure ebullated-bed hydroprocessing integrated with inline catalyst rejuvenation/regeneration. Accordingly, heavy hydrocarbon feedstocks such as crude oil are upgraded and/or desulfurized.

As used herein, the term "stream" (and variations of this term, such as hydrocarbon stream, feedstream, product stream, and the like) may include one or more of various hydrocarbon compounds, such as straight chain, branched or cyclical alkanes, alkenes, alkadienes, alkynes, alkylaromatics, alkenyl aromatics, condensed and non-condensed di-, tri- and tetra-aromatics, and gases such as hydrogen and methane, C2+hydrocarbons and further may include various impurities.

The term "zone" refers to an area including one or more equipment, or one or more sub-zones. Equipment may include one or more reactors or reactor vessels, heaters, heat exchangers, pipes, pumps, compressors, and controllers. Additionally, an equipment, such as reactor, dryer, or vessels, further may be included in one or more zones.

Volume percent or "V%" refers to a relative value at conditions of 1 atmosphere pressure and 15° C.

The phrase "a major portion" with respect to a particular stream or plural streams means at least about 50 wt % and up to 100 wt %, or the same values of another specified unit.

The phrase "a significant portion" with respect to a particular stream or plural streams means at least about 75 wt % and up to 100 wt %, or the same values of another specified unit.

The phrase "a substantial portion" with respect to a particular stream or plural streams means at least about 90, 95, 98 or 99 wt % and up to 100 wt %, or the same values of another specified unit.

The phrase "a minor portion" with respect to a particular stream or plural streams means from about 1, 2, 4 or 10 wt %, up to about 20, 30, 40 or 50 wt %, or the same values of another specified unit.

The term "crude oil" as used herein refers to petroleum extracted from geologic formations in its unrefined form. Crude oil suitable as the source material for the processes herein include Arabian Heavy, Arabian Light, Arabian Extra Light, other Gulf crudes, Brent, North Sea crudes, North and West African crudes, Indonesian, Chinese crudes, North or South American crudes, Russian and Central Asian crudes, or mixtures thereof. The crude petroleum mixtures can be whole range crude oil or topped crude oil. As used herein, "crude oil" also refers to such mixtures that have undergone some pre-treatment such as water-oil separation; and/or gas-oil separation; and/or desalting; and/or stabilization. In certain embodiments, crude oil refers to any of such mixtures having an API gravity (ASTM D287 standard), of greater than or equal to about 20°, 30°, 32°, 34°, 36°, 38°, 40°, 42° or 44°.

The heavy hydrocarbon feedstocks that are subject to the process herein including residues, short residues, long residues or other heavy fractions (including those having a nominal boiling range above the naphtha range, for instance above about 170-200° C.; having a nominal boiling range above an atmospheric gas oil range, for instance above about 330-370° C.; or having a nominal boiling range above a vacuum gas oil range, for instance above about 370-400° C.). The heavy hydrocarbon feedstocks can be derived from naturally occurring hydrocarbons including crude oil, synthetic crude oil, bitumen, oil sand, shale oil, coal liquids, or a combination including one of the foregoing sources. In certain embodiments heavy hydrocarbon feedstocks that are subject to the process herein can be vacuum gas oil, deasphalted oil and/or demetalized oil obtained from a solvent deasphalting process, light coker or heavy coker gas oil obtained from a coker process, cycle oil obtained from an FCC process, gas oil obtained from a visbreaking process, coal liquefaction, derived from bio-material conversion such as cellulose, wood pyrolysis, or any combination of the foregoing partially refined oil products. In certain embodiments, the heavy hydrocarbon feedstock is obtained from a crude distillation tower, such as an atmospheric or vacuum distillation tower, as atmospheric or vacuum residue. In additional embodiments, the heavy hydrocarbon feedstock can be whole crude oil, topped crude oil, and crude oil or topped crude oil that has undergone some pre-treatment, such as water-oil separation, gas-oil separation, desalting and/or stabilization. In certain embodiments, the heavy hydrocarbon feedstock is crude oil having a mixture of hydrocarbon compounds with boiling points in the range of about 36° C. to about the endpoint, for example about 1,500° C. In further embodiments a heavy hydrocarbon feedstock includes atmospheric and/or vacuum residual fractions having an endpoint value corresponding to the heaviest component of the feed, for example at or above about 1,500° C., and a lower range boiling point value starting at 370-520° C., 370-450° C. or 450-520° C. Such fractions include one or more streams in the vacuum residue range, for instance, boiling above about 520° C., or in the atmospheric residue range, for instance, boiling above about 370° C. In additional embodiments the heavy hydrocarbon feedstock can include hydrocarbon in the vacuum or atmospheric residue fraction range combined with lighter components such as vacuum gas oil typically boiling in the range of about 370-520° C., or atmospheric gas oil typically boiling in the range of about 240-370° C.

Heavy hydrocarbon feedstocks including crude oil are upgraded under relatively low pressure conditions in an ebullated-bed hydroprocessing zone to remove the heteroatom containing hydrocarbons. Catalyst particles are regenerated/rejuvenated and recycled back to the ebullated-bed hydroprocessing reaction zone. The regeneration/rejuvenation is effective to restore catalytic activity while minimizing leaching of the active components(s).

In the process and system herein, an ebullated-bed hydroprocessing zone is operated at low pressure levels compared to known hydroprocessing operations for treating a heavy hydrocarbon feedstock to remove metals including those present in the initial feed in the form of porphyrin type structures, reduce nitrogen and sulfur content, increase the API gravity, decrease micro carbon residue (MCR), and decrease asphaltenes. The present process utilizes a low pressure ebullated-bed hydroprocessing zone integrated with a catalyst rejuvenation/regeneration system to upgrade the heavy hydrocarbon feedstock. Catalyst particles, in certain embodiments in the form of extrudates of alumina, silica or alumina-silica including one or more active components for upgrading crude oil or residue (vacuum or atmospheric), are regenerated/rejuvenated and recycled back to the ebullated-bed hydroprocessing reaction zone, as described in more detail herein. The regeneration/rejuvenation is effective to restore catalytic activity while minimizing leaching of the active components(s).

Typically, high pressures, for instance greater than about 150, 160, 170 or 180 bars, are required for operations involving crude oil, or greater than about 120 bars for residual oil. In the process and system herein, the ebullated-bed hydroprocessing zone is operated at a relatively low hydrogen partial pressure level, for instance, less than about 120, 110, 100, 95, 90, 80 or 70 bars. As a result, significant capital cost savings can be realized at the reactor design and construction stage. Typical ebullated-bed hydroprocessing reactors for processing crude oil or residual oil require wall thicknesses of at least about 18, 19, 20, 21, 22 or 24 cm, which can weigh, for instance, about 315, 335, 354, 369, 383 or 411 metric tons for a 100,000 barrel per day unit. In contrast, the present process can use reactors having wall thicknesses of about 15, 14, 13, 12, 10 or 9 cm, which can weigh, for instance, about, 275, 256, 236, 216, 197 or 177 metric tons for a 100,000 barrel per day unit. For example, if operating pressure is lowered from 150 bars to 70 bars for a 100,000 barrel per day unit, the cost saving in capital investment can be about 40%. In addition, operational costs are reduced as the hydrogen consumption is decreased, as extensive hydrogenation reactions occur at higher pressures.

The catalyst particles in the ebullated-bed hydroprocessing reaction zone deactivates rapidly when operating at lower pressures, resulting in high catalyst consumption rates. Other drawbacks of conventional lower pressure units are operational problems due to coke built-up, sedimentation, and the like. Therefore low pressure operations are conventionally not considered a practical solution for upgrading heavy hydrocarbon feedstreams, including crude oil. However the present process overcomes these limitations by integrating a catalyst rejuvenation/regeneration system, enabling the upgrading of crude oil or heavy fractions thereof to obtain sweet light crude oil, or synthetic crude oil. In the integrated process and system herein, catalyst particles, in certain embodiments catalyst extrudates, are regenerated/rejuvenated and recycled back to the ebullated-bed hydroprocessing reaction zone.

In embodiments in which the heavy hydrocarbon feedstock is crude oil, the resulting product can be a treated crude oil, referred to as synthetic crude oil or upgraded crude oil. In embodiments in which the heavy hydrocarbon feedstock is a residual fraction such as vacuum or atmospheric residue, the resulting product can be a treated residue (vacuum or atmospheric), referred to upgraded residual oil (vacuum or atmospheric).

In certain embodiments of the present process, a crude oil or a residual fraction is upgraded by hydroprocessing, including HDM, HDN, HDS, CRR, HCK and/or HGN, and combinations thereof, to produce treated crude oil or treated residue. In certain embodiments, the upgraded synthetic crude oil product contains a sulfur content of 50 ppmw or less, and an API gravity value increase of at least 10 degrees as compared to the initial crude oil feedstock.

Under the low pressure conditions used in the herein ebullated-bed hydroprocessing operations, the catalyst will deactivate more rapidly than in a similar system operating at higher pressures, since coke will form on the catalyst material more readily under lower pressure conditions. A significant or substantial portion of the metal content of heavy hydrocarbon feedstocks used in the processes herein are in the form of metalloporphyrins. Metals in the porphryin structure are deposited on the catalyst particle surface as metals thereby blocking access to active sites, and organometallics diffuse into the pores of the catalyst particles. As the hydrogen partial pressure increases, hydrogenation reactions increase and more metals deposit on the catalyst particle surface. At lower hydrogen partial pressure conditions, some of the coke precursors, asphaltene containing metals, are polymerized and deposited as coke on the catalyst, wherein metals are in the coke structure. As a result, in the processes and systems herein, adverse effects of rapid catalyst deactivation necessitate a relatively higher catalyst replacement rate, which is accomplished by the integrated catalyst rejuvenation/regeneration zone. The hydrogen partial pressure in the ebullated-bed hydroprocessing reactor(s) in the integrated process herein is generally between 30-100, 40-100, 60-100, 30-90, 40-90, 40-80, 60-100, 60-90 or 60-80 bars, whereas conventional ebullated-bed processes for treating crude or residual oil operate at pressure levels of greater than about 150-200 for crude oil or 120-200 for residual oil.

The catalyst rejuvenation/regeneration is carried out in the integrated ebullated-bed hydroprocessing system and process herein to restore catalytic activity while minimizing leaching of the active components(s). This catalyst rejuvenation/regeneration process includes a rejuvenation sub-process for removing targeted metals, and regeneration sub-process to remove accumulated coke. The process and system can be optimized by utilizing the catalyst deactivation profile and rejuvenation characteristics of the catalysts. The catalytic activity of the spent catalyst particles that are rejuvenated/regenerated according to the process herein can be restored to 95, 96, 98, 99, 99.9% of the original activity of corresponding fresh catalyst particles. In certain embodiments, up to 70, 75, 80, 90, 95 or 99 wt % of the metals that accumulated on the catalyst particles is removed according to the rejuvenation/regeneration carried out herein.

In the catalyst rejuvenation/regeneration process integrated herein the rejuvenation step is carried out first, and the coke which accumulated on the surface of the catalyst particles during reaction serves to protect the active phase metals from being leached out. If the reverse were to occur, carrying out rejuvenation on the regenerated particles, the likelihood of damage to the catalyst is increased due to leaching of the active phase metals and support materials.

Catalyst rejuvenation is carried out on the catalyst particles from ebullated-bed hydroprocessing unit, and generally includes solvent washing and acid washing to remove undesired metals, and in certain embodiments water washing. Intermediate rejuvenated catalyst are provided, which are then subjected to regeneration to remove coke and produce rejuvenated/regenerated catalyst particles.

Acid leaching removes targeted contaminant metals such as nickel and vanadium compounds from the spent catalyst, with only minimal removal of the catalyst active metals and support material. The acid-leached spent catalyst is typically subjected to water washing to remove the residual acid solution. For instance, solvent washing can occur at a solvent:catalyst weight ratio in the range of about 1:1-3:1, at a catalyst temperature of about 35-80° C., for a contact time of about 60-120 minutes, and stirring at a speed in the range of about 1-20 rpm; acid washing can occur at an acid:catalyst weight ratio in the range of about 1:1-3:1, a contact time of about 60-120 minutes a stirring speed of about 1-20 rpm. Water washing can occur for a similar time range and stirring speed as solvent and acid washing.

A suitable catalyst rejuvenation system is disclosed in Duddy et al. U.S. Pat. Nos. 5,925,238 and 5,906,953, which are both incorporated by reference in their entireties. A catalyst rejuvenation system includes a vessel having inlet and outlet openings for the catalyst and washing liquids, and is arranged to facilitate successive solvent liquid washing, water washings, and acid treatment steps. A polar organic solvent which is both oil soluble and water soluble, such as acetone or other similar organic solvent liquid, is used in the solvent liquid washing, followed by water washing the substantially oil-free catalyst to remove the solvent without requiring any gas drying step. Further process steps include acid treating the oil-free catalyst with a suitable dilute acid solution such as 1-30, 5-30, 10-30, 1-20, 5-20 or 10-20% sulfuric acid, or other acids such as acetic acids, hydrochloric acids and nitric acids. The acid treatment is for substantial removal of contaminant metals such as nickel and vanadium compounds from the used catalyst, with only minimal removal of the catalyst active metals and support material, then again water washing the acid-treated catalyst to remove the residual acid solution. The acid treatment solution, temperature and time duration are selected so that the catalyst active metal removal does not exceed about 0.1, 1, 2, 4 or 6 wt. %. Since the polar solvent and acid liquids used for the washing and treatment steps are soluble in both oil and water, this catalyst rejuvenation process can utilize a two-step water washing procedure for the solvent washed and the acid treated catalyst, after which the solvent and the acid liquids can be recovered by distillation for reuse in the rejuvenation process. A catalyst rejuvenation system also includes suitable unit operation to heat and oxidize the solvent-washed and acid-treated during contact with an oxygen-containing gas such as inert gas/air or steam/air mixture at appropriate high temperature and time duration conditions to burn off and remove substantially all coke deposits from the catalyst.

Other suitable catalyst rejuvenation systems include those disclosed in Ganguli U.S. Pat. Nos. 4,454,240 and 4,595,666, which are both incorporated by reference in their entireties. In these processes, spent catalyst materials are rejuvenated by solvent washing and acid treatment steps, in which the spent catalyst is washed, for instance, with naphtha or toluene solvent to remove retained heavy oil. The washed catalyst material is heated to remove the retained solvent, and then water washed to fill the catalyst pores. The water washed catalyst material is then passed to an acid treatment vessel and contacted with a dilute acid solution. The acid-treated catalyst is washed with water to remove the retained acid, and then the material is dried and oxidized at desired high temperature to burn off carbon deposits.

Additional suitable catalyst rejuvenation systems include those disclosed in Tasker et al. U.S. Pat. Nos. 4,769,219 and 4,863,884, which are both incorporated by reference in their entireties. In these processes, used catalyst is rejuvenated in a single vessel, utilizing successive solvent washing, vacuum drying, acid treatment and gas drying steps.

Following catalyst rejuvenation as described above, the rejuvenated spent catalyst particles still include accumulated coke on the surface. Coke is the term used for large carbonaceous species often containing polyaromatic rings. These species fully or partially cover the active sites on the catalyst particles. These carbonaceous species also block the pores of the catalyst particles.

This accumulated coke is partially or fully removed by catalyst regeneration, which is a combustion process used to restore activity to the catalyst particles by combustion of coke. Restoration of the catalyst particles can be substantially complete depending upon the extent of coke build-up and/or regeneration conditions. For example, using an oxidizing atmosphere, such as typically air or an oxygen enriched gas, at a temperature in the range of about 400-900, 450-800 or 480-600° C., the catalyst regeneration process can remove the coke on the catalyst by burning the carbonaceous species, redisperses the active phase metal on the catalysts and removed other residual contaminants. In a typical regeneration process, a full combustion process is carried out producing $CO_2$ as a by-product, in contrast to gasification which is a partial combustion process producing syngas $H_2$+CO. By using an oxidizing atmosphere the catalyst regeneration process can remove the coke on the catalyst by burning the carbonaceous species. This redisperses the active phase metal on the catalyst particles and also removes other residual contaminants. In certain embodiments regeneration converts the sulfide phase back to an oxide phase similar to that of the fresh catalyst.

The ebullated-bed hydroprocessing sub-system can be a once-thru (single reactor) configuration; a series flow configuration with two or more reactors, or a series flow configuration with two or more reactors with separation steps between the reactors containing single or multiple catalysts designed for HDM, HDS, HDN, CRR, HCK and HGN.

The reactor configuration for hydroprocessing according to the processes and systems herein includes an ebullated-bed hydroprocessing unit, which is particularly effective for continuous, periodic or as-needed replacement of catalyst. The ebullated-bed hydroprocessing unit can include one or more reactors known in the art and associated ebullated pump(s) and gas/liquid separator(s).

In certain embodiments plural reactors are arranged in series, for instance with each carrying out different catalytic functionalities including HDM, HDN, HDS, CRR, HCK and/or HGN, and combinations thereof. In certain embodiments a series arrangement of vessels is used wherein the catalysts in each vessel are different and are separately rejuvenated/regenerated, and conversion can be increased due to the optimized catalysts. In additional embodiments, a series arrangement of vessels is used wherein the catalysts in each vessel are different and, wherein catalyst particles from one or more of the vessels are disposed of or regenerated conventionally, and wherein catalyst particles from one or more of the vessels are rejuvenated/regenerated as described herein. For instance, HDM catalyst particles can be used in a first vessel and disposed of or regenerated conventionally as they are most contaminated, and less contaminated catalyst particles from subsequent hydroprocessing steps (HDS, HDN, CRR, HCK and/or HGN) can be subjected to rejuvenation/regeneration as disclosed herein. In further embodiments, the HDM catalyst particles can be subjected to the rejuvenation/regeneration as disclosed herein.

In certain embodiments plural reactors are arranged in series, for instance with each carrying out the same catalytic functionalities including HDM, HDN, HDS, CRR, HCK and/or HGN, and combinations thereof. In certain embodiments a series arrangement of vessels is used with gas/liquid separators therebetween, and wherein the catalysts in each vessel are the same and are rejuvenated/regenerated in a common unit, and conversion can be increased by increasing liquid hourly or weighted hourly space velocity.

In certain embodiments plural reactors are arranged in parallel, for instance with each carrying out the same catalytic functionalities including HDM, HDN, HDS, CRR, HCK and/or HGN, and combinations thereof. In certain embodiments a parallel arrangement of vessels is used wherein the catalysts in each vessel are the same and are rejuvenated/regenerated in a common subsystem, and conversion can be increased by increasing liquid hourly or weighted hourly space velocity.

In the hydroprocessing operations herein, in conjunction with the above-identified low pressure conditions, the following general operating conditions can be employed: a temperature in the range of about 350-500° C., a liquid hourly space velocity based on the volume of the reactor (LHSV) in the range of about 0.1-2.0 or 0.1-4.0 $h^{-1}$, and a hydrogen oil ratio of 500-2,500 or 700-2500 standard liters of hydrogen per liter of oil, and a catalyst replacement rate of between about 0.1-5 or 0.1-10 kilograms of catalyst per cubic meter of feed.

FIG. 1 is a schematic process flow diagram of a process and system for upgrading a heavy hydrocarbon feedstock including ebullated-bed hydroprocessing and catalyst rejuvenation/regeneration. A heavy hydrocarbon feedstock 102 is introduced to a low pressure ebullated-bed hydroprocessing reaction zone 120 along with hydrogen 104 and catalyst particles stream 106. The catalyst particles stream 106 can be used to introduce catalyst particles at start-up and/or to introduce additional make-up catalyst particles as necessary while the reaction is underway. The ebullated-bed hydroprocessing reaction zone 120 is operated under conditions effective to remove heteroatoms, to hydrocrack heavy molecules, and/or to hydrogenate hydrocarbons, to produce an upgraded heavy hydrocarbon effluent 124, as described herein. In certain embodiments the upgraded heavy hydrocarbon effluent 124 is upgraded crude oil or upgraded residual oil. A quantity of the catalyst particles material is withdrawn, schematically represented by stream 122, from the hydroprocessor 120, as is known in operation of ebullated bed reactors. In certain embodiments this catalyst withdrawal and corresponding catalyst addition can be at predetermined time intervals, for instance every 0.5-8 days. In certain embodiments this catalyst withdrawal and corresponding catalyst addition can be continuous or semi-continuous. The ratio of feed to catalyst can be, for example, 0.1-10.0 barrels of heavy hydrocarbon feedstock per kilogram of catalyst. The catalyst, which can be completely spent or partially spent due to deposition of metals and coke, is transferred to a catalyst rejuvenation/regeneration system 130. Catalytic activity is almost restored to the fresh catalyst material by removing the metals from the catalyst particles in a rejuvenation step, and removing coke from the catalyst surface in a regeneration step.

All, a major portion, a significant portion or a substantial portion of the rejuvenated/regenerated catalyst is recycled via a stream 132 back to the ebullated-bed hydroprocessing zone 120. Due to the low pressure design, the ebullated-bed hydroprocessing unit will consume more catalyst compared to a conventional high pressure design of an ebullated-bed hydroprocessing unit for crude or residual oil processing; however, the high catalyst cost resulting high catalyst consumption is offset by the catalyst recycle. A certain proportion of catalyst material or powder due to attrition is purged from the system via a stream 134. In certain operations, additional fresh catalyst particles are added via the stream 106 during operation. Catalyst addition requirements can be determined, for instance, at the pilot and unit design stage and is linked to the catalyst activity based on given performance and characteristics of the feedstock. Furthermore, catalyst can be added to compensate for withdrawn catalyst removed due to life cycle constraints. In certain embodiments contaminant composition, physical properties and mechanical properties are monitored to determine the quantity of purge.

In certain optional embodiments, the upgraded heavy hydrocarbon effluent 124 can be further upgraded by integrating one or more downstream high pressure separator and one or more fixed bed hydroprocessors, shown in dashed lines as units 150 and/or 160. The effluent 124 from hydroprocessor 120 can be separated in a separator 140 into a bottoms stream 142 containing hydrocarbons having a nominal boiling range in the atmospheric and/or vacuum residue range, and a light stream 144 containing atmospheric and/or vacuum distillates and gas streams, $H_2S$, $NH_3$, $C_1$-$C_4$ and hydrogen. In certain embodiments, all or a portion of the bottoms stream 142 can be recycled to the ebullated bed hydroprocessor 120, shown as stream 144. In certain embodiments, all or a portion of the bottoms stream 142 can be treated in a unit such as a residue hydroprocessing unit 160, which can be a fixed bed or a separate ebullated bed reactor, shown as stream 146, to produce a further upgraded residue stream 162, which optionally can be combined with products from unit 150 as a combined upgraded effluent 154. In certain embodiments, all or a portion of the bottoms stream 142 can be combined with products from unit 150 as a combined upgraded effluent 154 (that is, bypassing or not utilizing a residue hydroprocessing zone 160). Stream 144 can be hydrotreated in one or more integrated fixed-bed hydrotreating unit(s) 150 for further upgrading, for instance, which can include separate units for distillates and vacuum gas oil. In certain embodiments hydrotreated distillates effluents 152, having the light gases including $H_2S$, $NH_3$, $C_1$-$C_4$ and hydrogen removed therefrom (not shown), can be combined with the bottoms 142 from the high pressure separator 140 to produce a further upgraded heavy hydrocarbon effluent 154, for instance upgraded synthetic crude oil when the initial feedstock is crude oil. In other embodiments these streams can be recovered separately.

Figure 2:
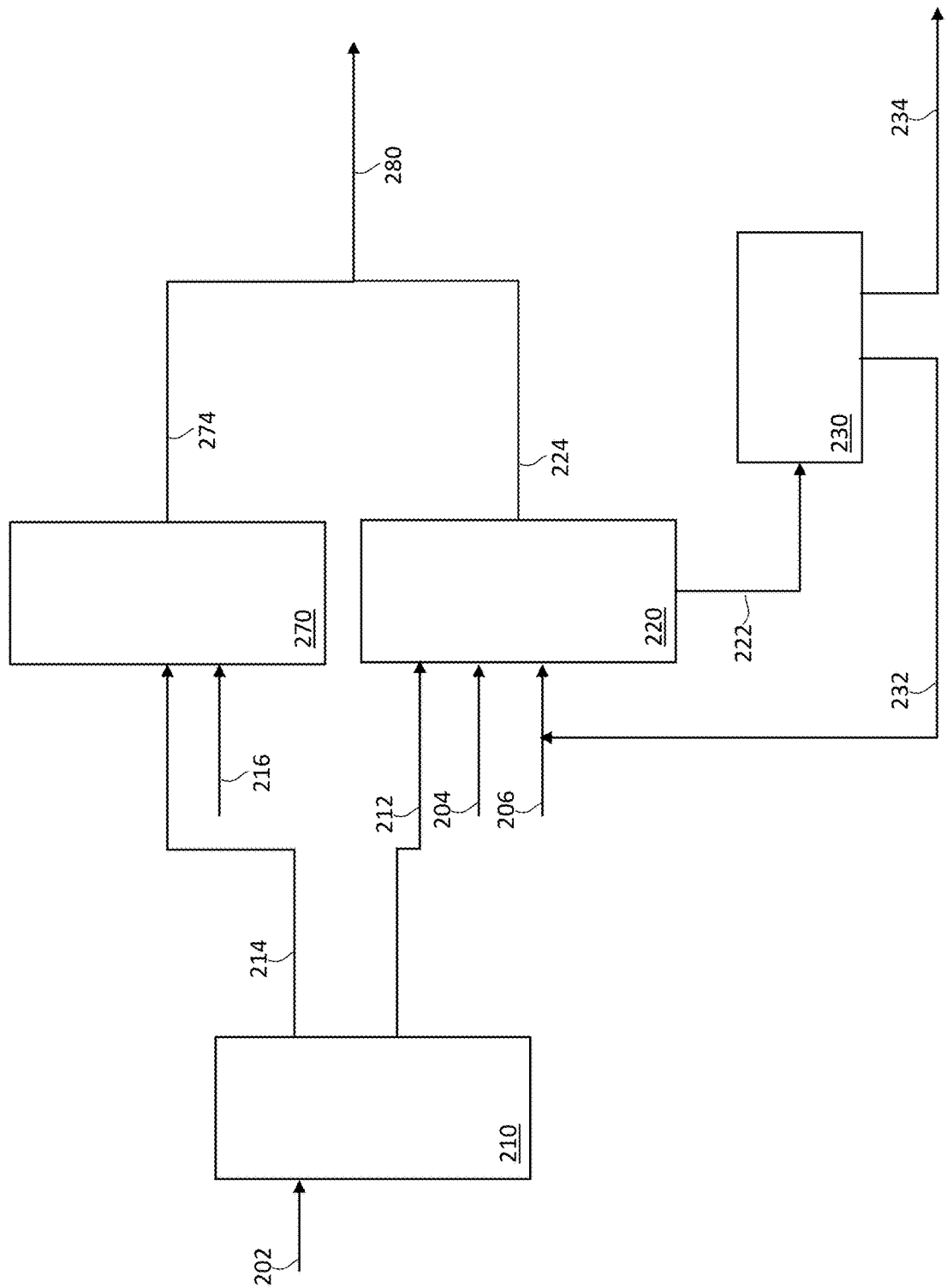
FIG. 2 is a schematic process flow diagram of another embodiment of a process to produce upgraded crude oil including fractionator followed a hydrotreater for distillates treating and a low pressure hydroprocessor integrated with a catalyst rejuvenation system for treating bottoms.

Referring to FIG. 2, another embodiment of a process for producing upgraded crude oil is shown. A hydrocarbon feedstock 202 fractioned in an atmospheric fractionation column 210 to separate the crude oil into: a distillates fraction 214, for instance containing hydrocarbons having full range naphtha and distillates (for instance having a nominal starting boiling point of about 36° C. to a nominal end point in the range of about 330-370° C.), or heavy naphtha and distillates (for instance having a nominal starting boiling point in the range of about 70-90° C. to a nominal end point in the range of about 330-370° C.); and atmospheric residue fraction 212, for instance containing hydrocarbons having a nominal boiling range above about 330-400° C. The distillate fraction 214 and hydrogen 216 are introduced to a fixed-bed hydrotreating unit 270 for hydrotreating to produce a treated effluent 274. The atmospheric residue fraction 212 is introduced to a low pressure hydroprocessor 220 along with hydrogen 204 and catalyst 206 operating under conditions effective to remove heteroatoms, and hydrogenate and hydrocrack heavy molecules and produce an upgraded residual oil 224. In certain embodiments all or a portion of the treated effluent 274 and all or a portion of the upgraded residual oil 224 are combined to form an upgraded stream 280, for instance upgraded synthetic crude oil when the initial feedstock is crude oil. In some embodiments, a distillates portion of the stream 224 can be separated and sent to fixed-bed hydrotreater for further treatment.

A portion of catalyst material is withdrawn, schematically represented by stream 222, from the hydroprocessor 220 at predetermined time intervals. The catalyst, which can be completely spent or partially spent due to deposition of metals and coke, is transferred to a catalyst rejuvenation system 230. Catalytic activity is restored to the catalyst material by removing the metals and coke from the catalyst surface in the catalyst rejuvenation system. The rejuvenated catalyst is recycled via stream 232 back to the hydroprocessor. A certain proportion of catalyst material is purged from the system via stream 234.

The ebullated-bed hydroprocessing unit operation in the systems and methods herein include a catalyst replacement sub-system. Ebullated-bed reactors are used in hydroprocessing generally to overcome plugging problems commonly associated with fixed-bed reactors, for instance during processing of relatively heavy feedstocks. Ebullated-bed reactors are incorporated in various refinery operations, including processes for upgrading heavy liquid hydrocarbons and conversion of coal to synthetic oils. In an ebullated-bed reactor, the catalyst is in an expanded bed, thereby obviating plugging problems associated with fixed-bed reactors. The fluidized nature of the catalyst in an ebullated-bed reactor also allows for on-line catalyst replacement of a small portion of the bed, on a continuous or intermittent basis. This results in a high net bed activity which does not vary with time. Known ebullated-bed processes and systems are described by Johanson in U.S. Pat. Nos. 2,987,465 and 3,197,288, both of which are incorporated by reference herein.

Figure 3:
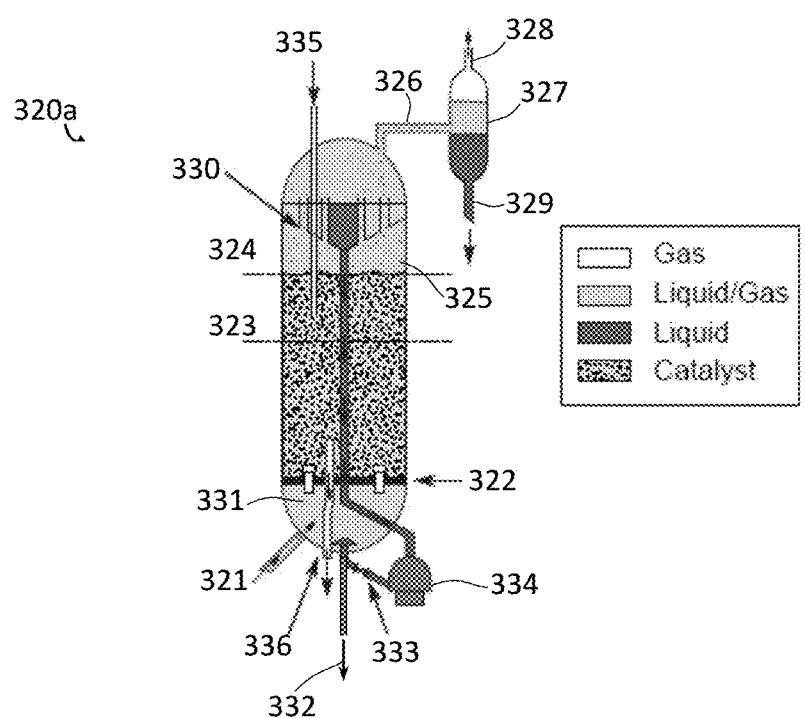
FIG. 3 is a schematic illustration of an ebullated-bed hydroprocessor.

With reference to FIG. 3, an ebullated-bed reactor 320a generally include concurrently flowing streams of liquids or slurries of liquids and solids, and gas, through a vertically-oriented cylindrical vessel containing catalyst. The catalyst is placed in motion in the liquid and has a gross volume dispersed through the liquid medium that is greater than the volume of the mass when stationary. Typically, a liquid hydrocarbon phase and a gaseous hydrogen phase are passed upwardly through the bed of catalyst particles at a rate such that the particles are forced into motion as the fluids pass upwardly through the bed. A feed stream and a hydrogen stream are introduced near the bottom of the vessel via an inlet 321. The catalyst bed can, for instance, maintained by a distributor grid plate 322, be characterized by a settled catalyst level 323 and an expanded catalyst level 324. The catalyst bed expansion level is, at least in part, determined by the bottoms recycle liquid flow rate, which is controlled by an ebullating pump. During steady state operation (ebullated-bed state), the bulk of the catalyst does not rise above a certain expanded catalyst level 324 in the reactor, in certain embodiments a level that is predetermined during reactor design. A substantial portion of the product vapors and liquids pass through the upper level of catalyst particles into a substantially catalyst-free zone 325 and are removed via a conduit 326 proximate to the upper portion of the reactor. Gases 328 and a portion of the liquid effluent 329 are recovered via a gas/liquid separator 327. Other liquids, for instance heavier liquid, are transferred, for example via a recycle cup 330, to a catalyst-free zone 331 the bottom of the reactor and removed from the reactor as net product effluent 332 and a recycle stream 333 from this catalyst-free zone. A certain portion of the vapor can be separated from the liquid recycle stream before being passed through the recycle conduit drawn by suction of an ebullating pump 334. Catalyst materials is added 335 and withdrawn 336 on a continuous or intermittent basis.

Effective catalysts used in the ebullated-bed hydroprocessing zone include heterogeneous catalyst particles having functionality for HDM, HDN, HDS, CRR, HCK and/or HGN. The catalysts generally contain one or more active components for upgrading crude oil or residue (vacuum or atmospheric). The active components are typically metals or metal compounds (oxides or sulfides) and are selected from the Periodic Table of the Elements IUPAC Groups 6, 7, 8, 9 and 10. One or more active metal component(s) are typically deposited or otherwise incorporated on a support, which can be amorphous and/or structured, such as alumina, silica-alumina, silica, titania, titania-silica or titania-silicates. Combinations of active metal components can be composed of different particles containing a single active metal species, or particles containing multiple active species. For example, effective hydrotreating catalysts include one or more of an active metal component selected from the group consisting of Co, Ni, W, Mo (oxides or sulfides), incorporated on an alumina support, typically with other additives. The active metal component(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10. In certain embodiments, the active metal component(s) include one or more of Co, Ni, W and Mo, and effective concentrations are based on all the mass of active metal components on an oxide basis. In certain embodiments, hydrotreating catalysts include Ni/W/Mo, Co/Mo, Ni/Mo, Ni/W, and/or Co/Ni/Mo. Combinations of one or more types of Ni/W/Mo, Co/Mo, Ni/Mo, Ni/W and/or Co/Ni/Mo catalysts are useful in certain embodiments.

The catalyst particles are provided in a shape of suitable dimension, such as granules, extrudates, tablets, or pellets, and may be formed into various shapes or forms such as spheres, cylinders, trilobes, quadrilobes or natural shapes. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units.

EXAMPLE

1000 Kg of Arab heavy crude oil, the properties of which are shown in Table 1, is hydroprocessed in a configuration following that shown in FIG. 1. The catalyst used was a commercially available alumina based ebullated-bed catalyst. The catalyst contained nickel and molybdenum as active phase metals. Sweet-light synthetic crude oil was produced. The experiments were carried out operating the ebullated-bed reactor at a LHSV of 0.5 $h^{-1}$, an operating temperature of 370° C. and a hydrogen partial pressure of 80 bars. The material balance is given in Table 1.

TABLE 1

Material Balance

| Stream Name | | Arab Heavy CO | Hydrogen | Fresh Catalyst | Synthetic Crude Oil | Spent Catalyst | Rejuvenated Catalyst | Catalyst Loss |
|---|---|---|---|---|---|---|---|---|
| Feed Rate | kg | 1000 | 74.00 | 2.69 | 1067 | 3.2 | 2.56 | 0.13 |
| Density | Kg/Lt | 0.8904 | | | 0.876 | | | |
| API Gravity | ° | 27.4 | | | 30.0 | | | |
| Carbon | W % | 84.8233 | | | 85.04 | | | |
| Hydrogen | W % | 12.18 | 100.00 | | 12.83 | | | |
| Sulfur | W % | 2.8297 | | | 1.99 | | | |
| Nitrogen | ppmw | 1670 | | | 535 | | | |
| MCR | W % | 8.2 | | | 2.55 | | | |
| Nickel | ppmw | 16.4 | | | 1 | | | |
| Vanadium | ppmw | 56.4 | | | 1 | | | |
| C5- Asphaltenes | W % | 7.8 | | | | | | |
| C7- Asphaltenes | W % | 4.2 | | | | | | |
| Toluene insolubles | W % | 0.0008 | | | | | | |
| Ashes | W % | 0.014 | | | | | | |
| Composition | | — | | — | — | | | |
| Hydrogen | Kg/h | | 74.00 | | | | | |
| H2S | Kg/h | 0.00 | | 0.00 | 24.54 | | | |
| NH3 | Kg/h | 0.00 | | 0.00 | 1.28 | | | |
| C1 | Kg/h | 0.00 | | 0.00 | 0.85 | | | |
| C2 | Kg/h | 0.00 | | 0.00 | 0.85 | | | |
| C3 | Kg/h | 0.00 | | 0.00 | 2.13 | | | |
| C4 | Kg/h | 0.00 | | 0.00 | 7.68 | | | |
| 36-85 | Kg/h | 46.67 | | 0.00 | 42.36 | | | |
| 85-150 | Kg-h | 72.30 | | 0.00 | 68.61 | | | |
| 150-250 | Kg/h | 160.20 | | 0.00 | 157.92 | | | |
| 250-350 | Kg/h | 120.10 | | 0.00 | 198.46 | | | |
| 350-540 | Kg/h | 262.60 | | 0.00 | 313.59 | | | |
| 540+ | Kg/h | 338.20 | | 0.00 | 255.76 | | | |
| Total | | 1000.00 | | 0.00 | 1074.04 | | | |

The method and system of the present invention have been described above and in the attached drawings; however, modifications will be apparent to those of ordinary skill in the art and the scope of protection for the invention is to be defined by the claims that follow.

The invention claimed is:

1. A process for a treatment of a crude oil having naphtha removed having a mixture of hydrocarbon compounds with boiling points in the range of about 170-200° C. to an endpoint value corresponding to the heaviest component of the crude oil comprising:

hydroprocessing the crude oil having naphtha removed at a hydrogen partial pressure of less than 100 bars in an ebullated-bed hydroprocessing unit having an associated ebullating pump and a catalyst replacement system to produce an effluent which is recovered as an upgraded heavy hydrocarbon effluent, wherein catalyst particles are used in the ebullated-bed hydroprocessing unit which comprise heterogeneous catalyst particles having active components incorporated on a support and which are characterized by an initial catalytic activity when the catalyst particles are freshly added to the ebullated-bed hydroprocessing unit;

withdrawing spent catalyst particles from the ebullated-bed hydroprocessing unit having contaminant metals and coke, wherein the spent catalyst particles have reduced catalytic activity compared to the initial catalytic activity;

rejuvenating spent catalyst particles that contain coke which accumulated on the surface of the catalyst particles during reaction, wherein rejuvenating comprises solvent washing and acid washing to leach contaminant metals and produce intermediate rejuvenated catalyst particles, wherein coke serves to protect the active components incorporated on the support of the catalyst particles from leaching due to the acid washing;

regenerating the intermediate rejuvenated catalyst particles by combustion in an oxidizing atmosphere to combust coke and redisperse active components on the catalyst particles and produce rejuvenated/regenerated catalyst particles, wherein the rejuvenated/regenerated catalyst particles have increased catalytic activity relative to the spent catalyst particles; and recycling the rejuvenated/regenerated catalyst particles to the ebullated-bed hydroprocessing unit.

2. The process as in claim 1, wherein the upgraded heavy hydrocarbon effluent is separated into a light fraction and an upgraded heavy fraction.

3. The process as in claim 2, wherein the upgraded heavy fraction comprises residue.

4. The process as in claim 2, wherein the upgraded heavy fraction comprises atmospheric residue.

5. The process as in claim 2, wherein the upgraded heavy fraction comprises vacuum residue.

6. The process as in claim 3, wherein all or a portion of the upgraded heavy fraction is recycled to the ebullated-bed hydroprocessing unit.

7. The process as in claim 2, wherein the light fraction is hydrotreated in a fixed bed hydrotreater to produce a hydrotreated light fraction effluent.

8. The process as in claim 7, further comprising combining the hydrotreated light fraction effluent with the upgraded heavy fraction to produce a further upgraded heavy hydrocarbon effluent.

9. A process for upgrading a crude oil stream comprising:
fractionating the crude oil into a distillates fraction and atmospheric residue;
hydrotreating the distillates fraction in a fixed-bed hydrotreating unit to produce a hydrotreated distillate effluent;
hydroprocessing the atmospheric residue at a hydrogen partial pressure of less than 100 bars in an ebullated-bed hydroprocessing unit having an associated ebullating pump and a catalyst replacement system to produce an effluent which is recovered as an upgraded residue effluent, wherein catalyst particles are used in the ebullated-bed hydroprocessing unit which comprise heterogeneous catalyst particles having active components incorporated on a support and which are characterized by an initial catalytic activity when the catalyst particles are freshly added to the ebullated-bed hydroprocessing unit;
withdrawing spent catalyst particles from the ebullated-bed hydroprocessing unit having contaminant metals and coke, wherein the spent catalyst particles have a reduced catalytic activity compared to the initial catalytic activity;
rejuvenating spent catalyst particles that contain coke which accumulated on the surface of the catalyst particles during reaction, wherein rejuvenating comprises solvent washing and acid washing to leach contaminant metals and produce intermediate rejuvenated catalyst particles, wherein coke serves to protect the active components incorporated on the support of the catalyst particles from leaching due to the acid washing;
regenerating the intermediate rejuvenated catalyst particles by combustion in an oxidizing atmosphere to combust coke and redisperse active components on the catalyst particles and produce rejuvenated/regenerated catalyst particles, wherein the rejuvenated/regenerated catalyst particles has increased catalytic activity relative to the spent catalyst particles; and
recycling the rejuvenated/regenerated catalyst particles to the ebullated-bed hydroprocessing unit.

10. The process as in claim 9, further comprising combining the hydrotreated distillate effluent with the upgraded residue to produce upgraded crude oil.

11. The process as in claim 1, wherein the catalytic activity of the rejuvenated/regenerated catalyst particles is 95% of the initial catalytic activity.

12. The process as in claim 1, wherein metals accumulate on the catalyst particles during reaction in the ebullated-bed hydroproces sing unit, and wherein up to 70 wt % of the metals that accumulated on the catalyst particles are removed.

13. The process as in claim 1, wherein rejuvenating consists of solvent washing and acid washing.

14. The process as in claim 9, wherein rejuvenating consists of solvent washing and acid washing.

* * * * *